(12) United States Patent
Wang et al.

(10) Patent No.: US 7,480,544 B2
(45) Date of Patent: Jan. 20, 2009

(54) OPERATION METHOD OF ENERGY-SAVING FLUID TRANSPORTING MACHINERIES IN PARALLEL ARRAY WITH CONSTANT PRESSURE

(75) Inventors: Chi-Yi Wang, Miaulih (TW);
Wen-Cheng Huang, 3F, 8, Wu Fu Road, Tourfenn, Miaulih, 351 (TW);
Wu-Hsiung Fu, Miaulih (TW)

(73) Assignee: Wen-Cheng Huang, Hsinchu County (TW)

( * ) Notice: Subject to any disclaimer, the term of this patent is extended or adjusted under 35 U.S.C. 154(b) by 0 days.

(21) Appl. No.: 11/482,805

(22) Filed: Jul. 10, 2006

(65) Prior Publication Data

US 2007/0150113 A1 Jun. 28, 2007

(30) Foreign Application Priority Data

Dec. 2, 2005 (TW) .............................. 94142386 A

(51) Int. Cl.
*G05D 11/00* (2006.01)
(52) U.S. Cl. .............................. 700/282; 417/3; 417/5; 73/1.16
(58) Field of Classification Search ................. 700/282; 417/1, 2, 3, 5; 73/1.16
See application file for complete search history.

(56) References Cited

U.S. PATENT DOCUMENTS

| 4,404,646 | A * | 9/1983 | Edlund et al. ................... 703/9 |
| 4,805,118 | A * | 2/1989 | Rishel .......................... 702/47 |
| 7,010,393 | B2 * | 3/2006 | Mirsky et al. ................ 700/282 |
| 2005/0047922 | A1 * | 3/2005 | Brown .......................... 417/22 |
| 2005/0191184 | A1 * | 9/2005 | Vinson, Jr. ................. 417/44.2 |

\* cited by examiner

*Primary Examiner*—Paul L Rodriguez
*Assistant Examiner*—Nathan Laughlin
(74) *Attorney, Agent, or Firm*—Muncy, Geissler, Olds & Lowe, PLLC

(57) ABSTRACT

The present invention discloses a system of energy-efficient and constant-pressure fluid-transport machines coupled in parallel, which can flexibly and massively provide gas and water to every fabrication unit. The system of the present invention comprises: variable-frequency centrifugal fluid-transport machines, pressure gauges, power meters, flow meters, and controllers. The performance curves of the abovementioned system of fluid-transport machines coupled in parallel and the system impedance curves of the loads are analyzed theoretically and built in the controllers together with the equal-efficiency curves provided by the manufacturer. When the system is operating, the data detected by the pressure gauges, power meters, and flow meters are compared with the built-in data to obtain the optimal energy-efficient conditions as the operational criteria of the system of the present invention.

4 Claims, 14 Drawing Sheets

| serial number of a pipe | diameter (in) | length (ft) | roughness (in) | Quantity of 45° corners | Quantity of 90° corners |
|---|---|---|---|---|---|
| 1 | 6 | 25 | 0.0018 | 0 | 1 |
| 2 | 6 | 10 | 0.0018 | 0 | 1 |
| 3 | 6 | 35 | 0.0018 | 0 | 2 |
| 4 | 6 | 10 | 0.0018 | 0 | 2 |
| 5 | 6 | 3.3 | 0.0018 | 0 | 0 |
| 6 | 10 | 3.3 | 0.0018 | 0 | 0 |
| 7 | 12 | 15 | 0.0018 | 0 | 0 |
| 8 | 10 | 3.3 | 0.0018 | 0 | 0 |
| 9 | 10 | 3.3 | 0.0018 | 0 | 0 |
| 10 | 10 | 10 | 0.0018 | 0 | 0 |
| 11 | 12 | 88 | 0.0018 | 0 | 7 |
| 12 | 15.75 | 42 | 0.0018 | 0 | 1 |
| 13 | 20 | 83 | 0.0018 | 2 | 2 |
| 14 | 20 | 10 | 0.0018 | 0 | 0 |
| 15 | 20 | 10 | 0.0018 | 0 | 0 |
| 16 | 20 | 10 | 0.0018 | 0 | 0 |
| 17 | 20 | 15 | 0.0018 | 0 | 1 |

| | |
|---|---|
| density of working fluid ($lbm/ft^3$) | 0.075 |
| fluid viscosity coefficient ($lbf \cdot s/ft^2$) | 3.84e-7 |

FIG. 7

OPERATION METHOD OF ENERGY-SAVING FLUID TRANSPORTING MACHINERIES IN PARALLEL ARRAY WITH CONSTANT PRESSURE

BACKGROUND OF THE INVENTION

1. Field of the Invention

The present invention relates to a fluid-transport machinery coupled in parallel, particularly to a system of energy-efficient and constant-pressure fluid-transport machines coupled in parallel.

2. Description of the Related Art

For recent years, owing to the advance of technology, the industrial products are growing precise, delicate and miniature more and more. To mass-produce those precise, delicate and miniature products in low cost, the current high-tech factories grow in scale continuously, and the quality requirements thereof also become more and more strict, which is a challenge for the building companies of the high-tech factory and the facility engineers who maintain the high-tech factory, and which also drives the related personnel to zealously research solutions or develop new technologies to fulfill the requirements.

In the current high-tech factories, it is a basic requirement for fluid-transport machinery to supply the gas and water of sufficient flow rate and stable pressure to every unit requiring them. When the factory is of smaller scale, merely a single fluid-transport machine is enough to supply the required flow rate. When only a single machine is used, the pressure stability can be easily and simply controlled according the operational manual provided by the manufacturer. However, in the current high-tech factories, the scale of the factory is enlarged continuously, and the fabrication procedures also become more and more flexible, in order to reduce the fabrication cost and to achieve the product diversification, and therefore, a single-machine fluid-transport system can no more meet the requirement. In order to supply the gas and water of sufficient flow rate and stable pressure to every unit requiring them and to shift the pressure and flow rate of gas and water as soon as possible and meet the new procedure's requirements when the fabrication procedures are changed, a system of multiple fluid-transport machines is needed in the current high-tech factories coupled in parallel. The operation of fluid-transport machines coupled in parallel is more complicated and crucial than that of a single fluid-transport machine, and just an imprudent operation may damage the machines. However, even the manufacturer cannot provide a standard operational procedure for the system of transport-fluid transport machines coupled in parallel. Thus, the factory-building companies and the facility-maintaining personnel can only depend on the experience accumulated in practical operation. The operational standard assumed in such a way is not only multitudinous and complicated but also neither analyzed theoretically nor verified experimentally. Therefore, it is hard to determine whether the assumed operational standard can achieve the required security and rapidity. The system of multiple fluid-transport machines coupled in parallel consumes considerable energy; therefore, reducing the consumed energy thereof can benefit the fabrication cost very much. However, the objective of saving energy cannot be realized via the current operational standard, which is assumed from individual experience.

When the user purchases a centrifugal fluid-transport machine, such as a pump, a blower, or an exhaust fan, the manufacturer will provide the user with operational data, such as the performance curves shown in FIG. 1. In FIG. 1, the horizontal and vertical axes respectively represent flow rate and pressure. The performance curve of maximum usable rotation speed begins from the vertical axis and ends in some point of the diagram, which represents the critical usable point. The area located at the right side of the performance curve of maximum usable rotation speed is a region unsuitable to use. According the Affinity Law of fluid-transport machines, the relationships with respect to rotation speed (N), flow rate (Q), pressure (P), and power (HP) are shown below.

$$\left.\begin{array}{l}\dfrac{Q_1}{Q_2} = \dfrac{N_1}{N_2} \\[4pt] \dfrac{P_1}{P_2} = \left(\dfrac{N_1}{N_2}\right)^2 \\[4pt] \dfrac{HP_1}{HP_2} = \left(\dfrac{N_1}{N_2}\right)^3\end{array}\right\} \quad (1)$$

Based on the data of the performance curve of maximum usable rotation speed, and via theoretical analysis and calculation, the following equations respectively relating pressure (P) with rotation speed (N) and relating pressure (P) with flow rate (Q) can be obtained.

$$P = C_1 N^2 + C_2 N + C_3 \quad (2)$$

$$P = C_1 Q^2 + C_2 Q + C_3 \quad (3)$$

Via equations (2) and (3), the performance curves of the rotation speeds lower than the maximum usable speed can be obtained, as the dashed curves shown in FIG. 1. Further, the equal-efficiency curves and the equal-power curves are also plotted in FIG. 1.

There are not many patents about the system of multiple fluid-transport machines coupled in parallel proposed before. The Taiwan Patent No. 506683 "Parallel-coupled Electrical Fans" discloses: a system of multiple parallel-coupled electrical fans, wherein multiple electrical fans are installed in parallel to a one-piece frame; however, it does not mention how to control the parallel-coupled electrical fans at all. As to the method of controlling the fluid-transport machine, the Taiwan Patent No. I225908 "Method of Controlling a Pump System" discloses: a method of utilizing automatic control and operational parameters of a centrifugal pump to pump fluid to an outlet; however, this patent is confined to the control of a single centrifugal pump, wherein pump rotation speed, water temperature, pressures at the inlet and outlet of the pump, and the pressure difference thereof detected by the sensors are compared with the pre-stored data, and then, the pump is adjusted according to the comparing result. The Taiwan Patent No. M253699 "Devices of Controlling a Pump System" discloses: a variety of devices of controlling a single centrifugal pump, which is similar to the previous patent. As shown in their claims, the abovementioned pre-stored data is not deduced from the theories but acquired via arranging the data gathered from practical operations; such a method advantages in that the states of a pump, which are to be the basis of control, can be easily and rapidly obtained; however, there are two constrains on such a method: one is that it cannot apply to the system of multiple parallel-coupled machines but can only apply to a single machine; the other is that the control range is limited by the pre-stored data. About energy efficiency, whether energy can be saved thereby is an unknown.

Accordingly, via theoretical analysis and experimental verification, the present invention proposes a system of energy-efficient and constant-pressure fluid-transport machines coupled in parallel and the operational method thereof, which not only can achieve the secure, rapid, and energy-efficient operation of the system of multiple fluid-transport machines coupled in parallel but also can unify and simplify the operational standard thereof, and the building cost thereof can also be lowered.

SUMMARY OF THE INVENTION

Sequentially via the following theoretical analysis, equation deduction, and embodiment discussion, the system of energy-efficient and constant-pressure fluid-transport machines coupled in parallel of the present invention will be described in detail below. The flow rate in the load piping system is very important in the study of the system of multiple fluid-transport machines coupled in parallel; therefore, the distribution of the flow rate in the load piping system is to be calculated firstly.

The piping system shown in FIG. 2 is to be used as an exemplification of the load piping of the system of multiple fluid-transport machines coupled in parallel. As shown in FIG. 2, the piping system has 9 pipe sections (from pipe section 1 to pipe section 9) and 10 nodes (from node 1 to node 10, including: fluid inlets, fluid outlets and confluence points, i.e. the ends of all the pipe sections). Nodes 1, 2, 5, 6 are the inlets of branch pipes, and nodes 9, are the total outlets. Pipe sections 8, 9 respectively have fluid-transport machines, and the arrows thereof are not necessarily the real flow direction but the assumptive direction used in the calculation programs. In the system, the value to be calculated is the flow rate $Q_n$ in each pipe section, wherein the subscript n denotes the serial number of the pipe section. As there are 9 pipe sections, there are nine unknown values $Q_1, Q_2, \ldots Q_9$, which need nine independent linear equations to solve. According to the conservation of the flow rate at the nodes, the continuity equations can be established; for example, at node 3, the flow rate in pipe section 3 is equal to the sum of the flow rates in pipe sections 1 and 2, and it can be mathematically expressed as equation (4):

$$Q_1 + Q_2 - Q_3 = 0 \tag{4}$$

Similarly, at nodes 4, 7, 8, there are also three flow-rate-conservation equations (5), (6), (7):

$$Q_3 + Q_4 - Q_5 = 0 \tag{5}$$

$$Q_5 + Q_6 - Q_7 = 0 \tag{6}$$

$$Q_7 - Q_8 - Q_9 = 0 \tag{7}$$

As the conservation of flow rate does not exist at nodes 1, 2, 5, 6, 9, and 10, there is no flow-rate-conversation equation to implement solving flow rates.

The other five equations for solving flow rates can be acquired from the conservation of energy. For example, pipe section 3 has node 3 and node 4 respectively at two ends thereof, and when the fluid flows from node 3 to node 4, it means that the total pressure at node 3 is greater than that at node 4; the total pressures at nodes 3 and 4 are respectively denoted by $P_3$ and $P_4$; owing to friction and the piping structure, there is a loss of total pressure when the fluid flows from node 3 to node 4; the total pressure loss is denoted by $\Delta P_3$, and then, $$\Delta P_3 = P_3 - P_4 \tag{8}$$

The total pressure loss in pipe section 3 can also be mathematically expressed as $K_3 Q_3^2$ (it will be explained later), wherein $K_3$ is the coefficient of the total pressure loss in pipe section 3; then, equation (8) can be written as:

$$K_3 Q_3^2 = P_3 - P_4 \tag{9}$$

As each pipe section has its own structure and devices, each pipe section has different total pressure loss coefficient $K_n$, wherein the subscript is used to denote the serial number of the pipe section. The left portion of equation (9) has an unknown $Q_3$, and the right portion has two unknowns $P_3$ and $P_4$; thus, increasing one equation is at the cost of adding two redundant unknowns. The total pressures of all the inlets and outlets (i.e. nodes 1, 2, 5, 6, 9 and 10) can be supposed to be known. When the fluid enters into the load piping from node 1 and flows through pipe sections 1, 3, 5, 7 and 9 and then exits from node 10, according to the principle of energy conservation, which has been used in equation (8), $$\Delta P = P_1 - P_{10} \tag{10}$$

wherein $\Delta P$ is the sum of the total pressure loss in every pipe section and the total pressure change caused by the fluid-transport machine. Thus, $$\Delta P = \Delta P_1 + \Delta P_3 + \Delta P_5 + \Delta P_7 + \Delta P_9 \Delta P_{S9} \tag{11}$$

wherein $\Delta P_{S9}$ is the total pressure change induced by the fluid-transport machine when the fluid flows through pipe section 9, and how to deal with $\Delta P_{S9}$ will be discussed later. Substitute the expression of $\Delta P$ in equation (11) for $\Delta P$ in equation (10), and rearrange the terms as follows:

$$\Delta P_{S9} - \Delta P_9 - \Delta P_7 - \Delta P_5 - \Delta P_3 - \Delta P_1 = P_{10} - P_1 = C_1 \tag{12}$$

$P_{10}$ and $P_1$ are known and usually the pressures of the exterior environments; therefore, $C_1$ is a constant. Transform $\Delta P$ into the form of $KQ^2$ to obtain:

$$\Delta P_{S9} - K_9 Q_9^2 - K_7 Q_7^2 - K_5 Q_5^2 - K_3 Q_3^2 - K_1 Q_1^2 = C_1 \tag{13}$$

Similarly, the following equations can also be obtained:

$$\Delta P_{S9} - K_9 Q_9^2 - K_7 Q_7^2 - K_5 Q_5^2 - K_3 Q_3^2 - K_2 Q_2^2 = P_{10} - P_2 = C_2 \tag{14}$$

$$\Delta P_{S9} - K_9 Q_9^2 - K_7 Q_7^2 - K_5 Q_5^2 - K_4 Q_4^2 = P_{10} - P_5 = C_3 \tag{15}$$

$$\Delta P_{S9} - K_9 Q_9^2 - K_7 Q_7^2 - K_6 Q_6^2 = P_{10} - P_6 = C_4 \tag{16}$$

$$\Delta P_{S8} - K_8 Q_8^2 - K_7 Q_7^2 - K_6 Q_6^2 = P_9 - P_6 = C_5 \tag{17}$$

So far, from equations (4)~(7) and from equations (13) to (17), there are totally nine linear independent equations. In addition to nine unknowns of flow rates, there are still two unknowns $\Delta P_{S8}$ and $\Delta P_{S9}$ existing among those equations, which will be solved from the performance curves of the fluid-transport machines.

The abovementioned quadratic polynomial equation (3) can match the reality very well; therefore, the performance curve of the fluid-transport machine at a given rotation speed can be mathematically expressed as:

$$\Delta P_{S8} = C_{S1} Q_8^2 + C_{S2} Q_8 + C_{S3} \tag{18}$$

$$\Delta P_{S9} = C_{S1}' Q_9^2 + C_{S2}' Q_9 + C_{S3}' \tag{19}$$

wherein $C_{S1}, C_{S2}, C_{S3}, C'_{S1}, C'_{S2}$, and $C'_{S3}$ are all constants, and the subscript S denotes the fluid-transport machine. Except $\Delta P_{S8}$ and $\Delta P_{S9}$ each term in left sides of the equal signs of equations (13)~(17) is the total pressure loss coefficient multiplied by the flow rate squared. In order to add $\Delta P_{S8}$ and $\Delta P_{S9}$ into the calculation of the equations, via formula method, equations (18) and (19) are rewritten as:

$$\Delta P_{S8} = C_{S1} G_8^2 + C_{S4} \tag{20}$$

$$\Delta P_{S9} = C_{S1}' G_9^2 + C_{S4}' \tag{21}$$

wherein $$G_8 = Q_8 + \frac{C_{S2}}{2C_{S1}},$$

$$G_9 = Q_9 + \frac{C'_{S2}}{2C'_{S1}},$$

$$C_{S4} = C_{S3} - \frac{C_{S2}^2}{4C_{S1}},$$

and $$C'_{S4} = C'_{S3} - \frac{C'^2_{S2}}{4C'_{S1}}.$$

Substitute the expression of $\Delta P_{S9}$ in equation (21) for $\Delta P_{S9}$ in equation (13), and rearrange the terms as follows:

$$C_{S1}'G_9^2 - K_9 Q_9^2 - K_7 Q_7^2 - K_5 Q_5^2 - K_3 Q_3^2 - K_1 Q_1^2 = C_1 - C_{S4}' \quad (22)$$

Similarly, the expression of $\Delta P_{S8}$ and $\Delta P_{S9}$ in equations (20) and (21) can also substitute for $\Delta P_{S8}$ and $\Delta P_{S9}$ in equations (14)~(17). It can be found: in addition to the unknowns of flow rates, there are still two unknowns $G_8$ and $G_9$ existing in the left sides of the equal signs, and therefore, further two equations are needed, i.e. increasing one fluid-transport machine will increase one unknown also. From the process of the formula method, the relationships of $G_8$ and $G_9$ versus the flow rates of the corresponding pipe sections can be derived and mathematically expressed as:

$$G_8 - Q_8 = \frac{C_{S2}}{2C_{S1}} \quad (23)$$

$$G_9 - Q_9 = \frac{C'_{S2}}{2C'_{S1}} \quad (24)$$

So far, the system of equations has 11 equations and 11 unknowns, and thus, the flow rates of all the pipe sections can be solved. The $K_n$ (n=1, 2, . . . , 9) in equations (13)~(17) are all known values, and they are the coefficients of the total pressure loss, which includes: the loss caused by the friction between the fluid and the pipe, and the minor loss caused by the devices and parts installed to the pipe; therefore, the K values can be obtained via referring to the pipe loss coefficients.

When the fluid-transport machines of the same specification are coupled in parallel, the flow rate in the performance curve will also increase as many times as the fluid-transport machine does. FIG. 3 shows the performance curves of the systems having different numbers of fluid-transport machines coupled in parallel operating at a fixed speed. As shown in FIG. 3, at an identical pressure, the flow rate provided by two fluid-transport machines coupled in parallel is the double of that provided by a single fluid-transport machine. Similarly, at an identical pressure, the flow rate provided by three fluid-transport machines coupled in parallel is the triple of that provided by a single fluid-transport machine. In other words, the performance curves change with the quantities of fluid-transport machines coupled in parallel. If the performance curve of a single fluid-transport machine is mathematically expressed as:

$$P = C_{S1}Q^2 + C_{S2}Q + C_{S3} \quad (25)$$

wherein $C_{S1}$, $C_{S2}$, and $C_{S3}$ are constants. Let $Q_n$ (n=1, 2, 3, . . . , n) denote the integrated flow rate of the system of the fluid-transport machines coupled in parallel with n denoting the number of the fluid-transport machines coupled in parallel. When n fluid-transport machines are coupled in parallel, the fluid rate thereof will increase by n times, i.e. $Q_n = n \cdot Q$; substitute it into equation (25) to obtain the following equation:

$$P = \frac{C_{S1}}{n^2}Q_n^2 + \frac{C_{S2}}{n}Q_n + C_{S3} \quad (26)$$

which mathematically expresses the performance curve of the single equivalent machine of the system of multiple fluid-transport machines coupled in parallel.

For a complicated piping system, if the setting of the system is unchanged, the total pressure loss of the system will be proportional to the total flow rate squared. A system impedance curve can be formed via plotting the total pressure loss P against the total flow rate Q and can be mathematically expressed as:

$$\Delta P_{sys} = K_{sys} Q_{sys}^2 \quad (27)$$

wherein $K_{sys}$ is a constant, and $Q_{sys}$ is the total flow rate of the system, and $\Delta P_{sys}$ is the total pressure loss of the system. Therefore, with the system conditions unchanged, if the pressures at some flow rates are known, the system impedance curve can be acquired thereby.

FIG. 4 shows a system impedance curve and a performance curve of a single fluid-transport machine and an intercept point of them. The pressure and the flow rate corresponding to the intercept point are exactly the total pressure loss and the total flow rate of the system respectively, and therefore, the intercept point is called the operational point. In the piping system of a single fluid-transport machine, the total pressure loss of the system is equal to the pressure provided by the fluid-transport machine, and the total flow rate of the system is equal to the flow rate of the fluid-transport machine. If the mathematic expressions of the performance curve of the fluid-transport machine and the system impedance curve are known, substitute equation (27) into the equation of the performance curve to obtain:

$$C_{S1}Q_{sys}^2 + C_{S2}Q_{sys} + C_{S3} = K_{sys}Q_{sys}^2 \quad (28)$$

and then, obtain the solutions of $Q_{sys}$—the flow rate at the intercept point (the operational point) of the those two curves—via the formula method:

$$Q_{sys} = \frac{-C_{S2} \pm \sqrt{C_{S2} - 4(C_{S1} - K_{sys})C_{S3}}}{2(C_{S1} - K_{sys})} \quad (29)$$

For a fluid-transport machine installed in a piping system and operating at a fixed rotation speed, the flow rate thereof can be solved from equation (29). If the solved flow rate is not the expected value, the flow rate can be adjusted via changing the rotation speed of the fluid-transport machine. When the rotation speed of the fluid-transport machine is changed, the performance curve thereof also changes, and the operational point too. The performance curve of the fluid-transport machine can be worked out via the calculation according to the Affinity Law, and the relationships of flow rate versus rotation speed, pressure versus rotation speed, and power versus rotation speed have been shown in equation (1).

FIG. 5 shows the performance curves of a fluid-transport machine when it operates at the rotation speeds of 1750 rpm and 2275 rpm, wherein Point A and Point B are the operational points for different rotation speeds in the fixed system. From equation (27), the following relationship can be obtained:

$$\frac{P_A}{P_B} = \frac{K_{sys}Q_A^2}{K_{sys}Q_B^2} = \frac{Q_A^2}{Q_B^2} \quad (30)$$

According to equation (1), the relationship between Point A in the performance curve of 1750 rpm and Point C in the performance curve of 2275 rpm can be written as:

$$\frac{Q_A}{Q_C} = \frac{N_{1750}}{N_{2275}} \quad (31)$$

$$\frac{P_A}{P_C} = \frac{N_{1750}^2}{N_{2275}^2} \quad (32)$$

Substituting equation (31) into equation (32) can obtain:

$$\frac{P_A}{P_C} = \frac{Q_A^2}{Q_C^2} \quad (33)$$

Via comparing equation (30) and equation (33), it is found that Point B is exactly Point C. Therefore, when Operational Point A is known, Operational Point B, i.e. the intercept point of another performance curve and the system impedance curve, can be worked out with the Affinity Law.

When the pressure and the flow rate of Point B is the target pressure and the target flow rate of the system yet with the rotation speed of the fluid-transport machine being unknown, the rotation speed can be worked out as follows:

Firstly, according to equation (27), the parameter $K_{sys}$ is obtained by:

$$K_{sys} = \frac{P_B}{Q_B^2} \quad (34)$$

Suppose that the performance curve of the fluid-transport machine operating at the rotation speed of 1750 rpm can be mathematically expressed as equation (25). Substitute the coefficients of equation (25) and equation (34) into equation (29) to obtain the flow rate of the system $Q_A$. Then, according to equation (1), the rotation speed can be obtained by:

$$N_{sys} = N_{1750} \frac{Q_B}{Q_A} \quad (35)$$

Thus, the target flow rate can be obtained via adjusting the rotation speed of the fluid-transport machine to $N_{sys}$. According to equation (1), the performance curve of the adjusted rotation speed can be mathematically expressed as:

$$\frac{N_{1750}^2}{N_{sys}^2}P = C_{S1}\left(\frac{N_{1750}}{N_{sys}}Q\right)^2 + C_{S2}\left(\frac{N_{1750}}{N_{sys}}Q\right) + C_{S3} \quad (36)$$

Rearrange it to obtain:

$$P = C_{S1}Q^2 + C_{S2}\frac{N_{sys}}{N_{1750}}Q + \frac{N_{sys}^2}{N_{1750}^2}C_{S3} \quad (37)$$

According to the principles mentioned above, and based on the data shown in FIG. 6 and FIG. 7, the performance curve of FIG. 8 can be mathematically expressed as:

$$P = -0.8889Q^2 + 6.6667Q + 700 \quad (38)$$

In this exemplification, three fluid-transport machines of the same specification are coupled in parallel. According to equation (26), the performance curve of the single equivalent fluid-transport machine can be mathematically expressed as:

$$P = -0.0988Q^2 + 2.2222Q + 700 \quad (39)$$

Via equation (27), $K_{sys}$ is obtained by:

$$K_{sys} = \frac{563}{40^2} = 0.352 \quad (40)$$

Substitute the coefficients of the equation (39) and the constant of equation (40) into equation (29) to obtain:

$$Q_{sys} = \frac{-2.2222 - \sqrt{2.2222 - 4(-0.0988 - 0.352)700}}{2(-0.0988 - 0.352)} = 41.9(cfs).$$

As shown in FIG. 9, the worked-out total flow rate of the system is 41.9 cfs; however, the total flow rate required by the system is only 40 cfs; therefore, the rotation speed of the fluid-transport machine should be lowered. Suppose equation (38) is of the performance curve of the rotation speed of 1750 rpm. The desired rotation speed can be obtained according to equation (35) by:

$$N_{sys} = N_{1750}\frac{Q_B}{Q_A} = 1750\frac{40}{41.9} \approx 1670(rpm).$$

When the rotation speed is reduced to 1670 rpm, the performance curve can be obtained according to equation (37) and mathematically expressed as:

$$P = -0.8889Q^2 + 6.3619Q + 637.46 \quad (41)$$

Adopt the performance curve mathematically expressed by equation (41); the recalculated total flow rate will be 40 cfs, and the flow rates of all outlets are almost identical, and the pressures thereof are also uniform, as shown in the portion for three machines coupled in parallel of FIG. 10. According to the same method, the rotation speed required by two machines coupled in parallel can also be worked out, and the rotation speed thereof should be raised to 1850 rpm. As shown in the portion for two machines coupled in parallel of FIG. 10, the flow rates of all outlets are also almost identical, and the errors of the pressures are within only 2%.

As to the equal-efficiency curves in FIG. 1, they cannot be deduced theoretically but are obtained experimentally form practical operation by the manufacturer, and those data is no more further analyzed but will be used directly.

BRIEF DESCRIPTION OF THE DRAWINGS

FIG. 7 is a diagram showing the data of a working fluid and the data of all pipe sections.

DETAILED DESCRIPTION OF THE INVENTION

In practical operation, the time allowed to determine operational parameters is very short; therefore, it is hard to utilize the equations deduced above to calculate the operational parameters and then apply the worked-out parameters to control the system; thus, the required operational parameters are worked out beforehand, and then, the work-out parameters are directly applied to the system. The embodiments described below are to exemplify that the results worked out via the abovementioned equations are directly applied to the practical cases.

The embodiment to be discussed below supposes that the flow rate required by the system is $Q_T$, and the pressure of the system is a constant pressure $P_T$, and the maximum flow rate a single pump can provides is $Q_1$, and the maximum pressure a single pump can provide is $P_1$. When the system uses multiple pumps, the embodiment also supposes that those pumps are of the same specification of the same manufacturer in principle. From the abovementioned basic data, it is known: if $Q_T > Q_1$, a single pump cannot meet the requirement of flow rate, and if $P_1 > P_T$, it can meet the requirement of pressure.

Figure 1:
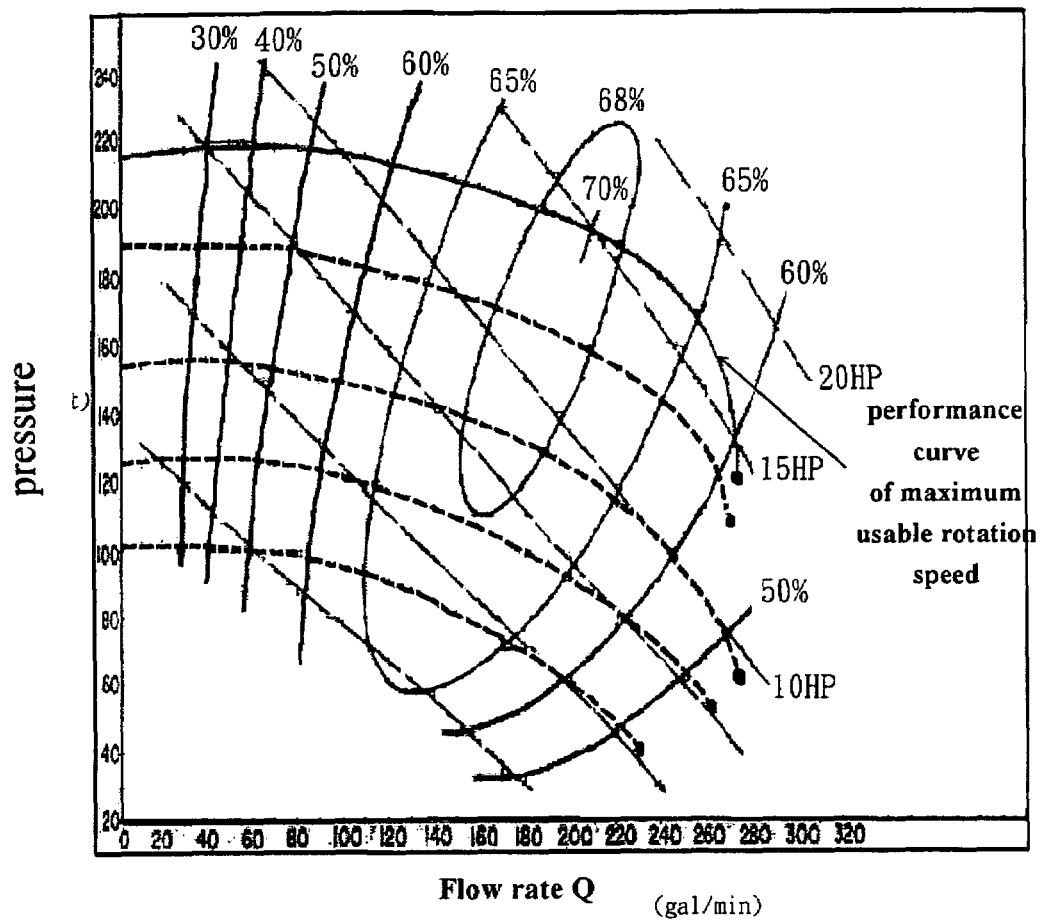
FIG. 1 is a diagram showing the data of a centrifugal fluid-transport machine.
Figure 2:
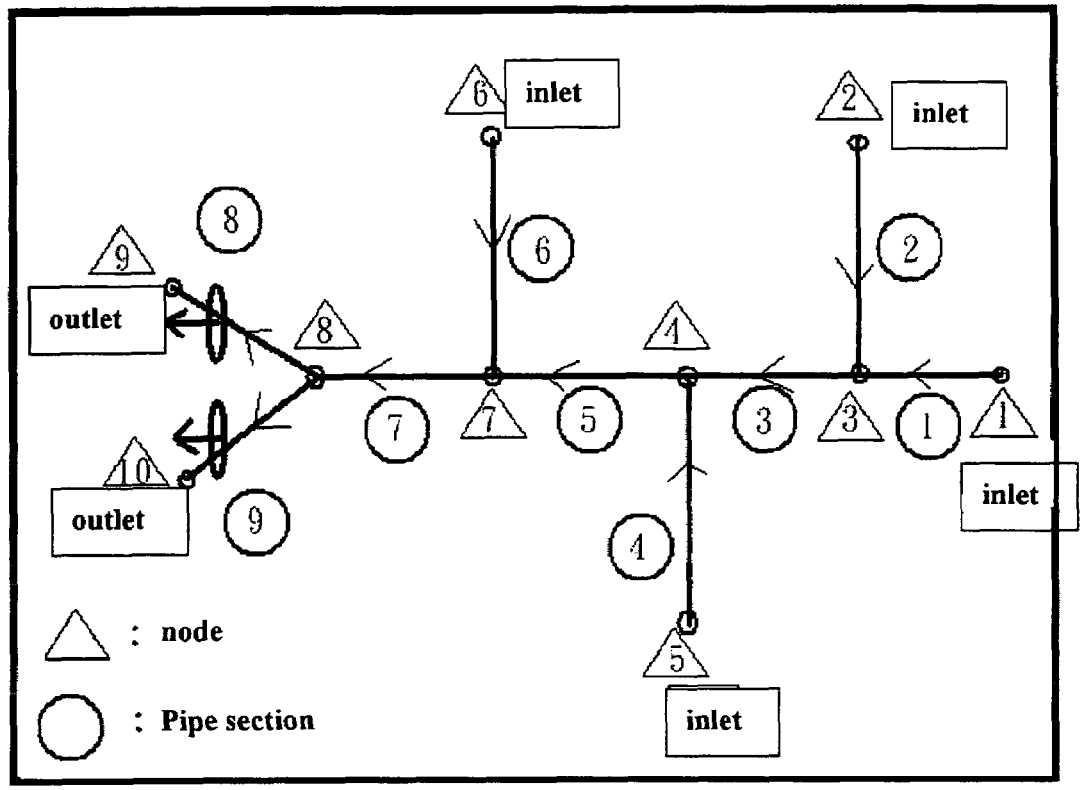
FIG. 2 is a diagram showing the system of multiple fluid-transport machines coupled in parallel and the load piping system.
Figure 3:
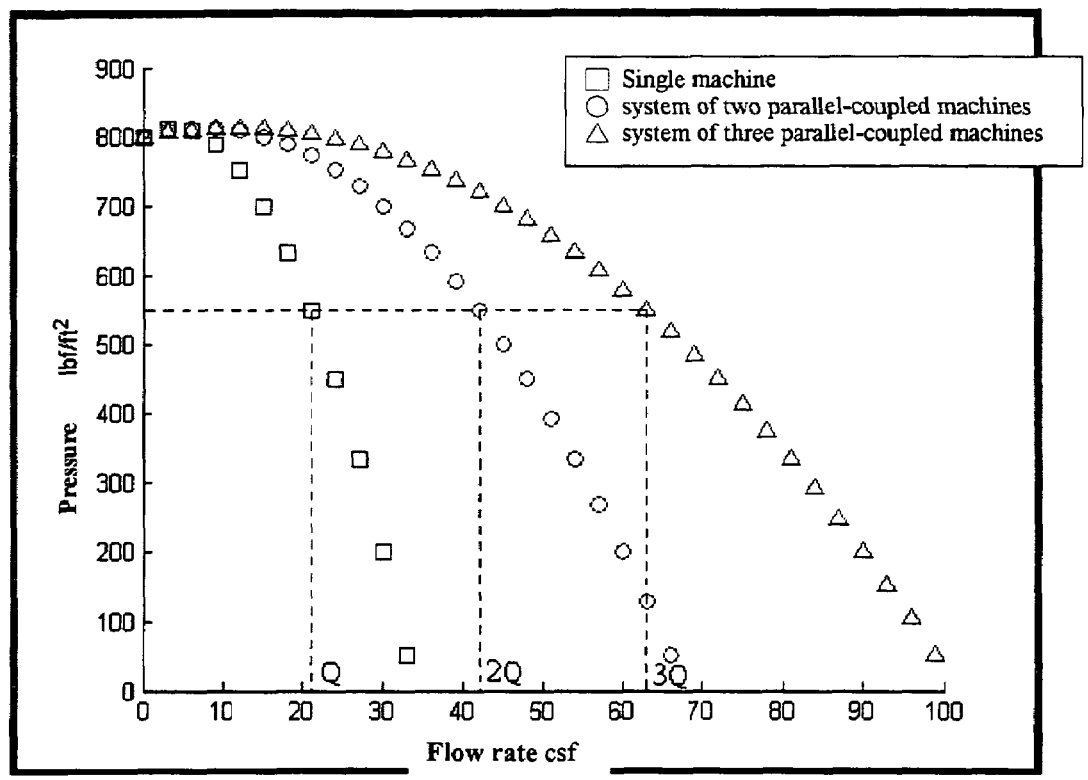
FIG. 3 is a diagram showing the performance curves of a single fluid-transport machine, the system of two fluid-transport machines coupled in parallel, and the system of three fluid-transport machines coupled in parallel.
Figure 4:
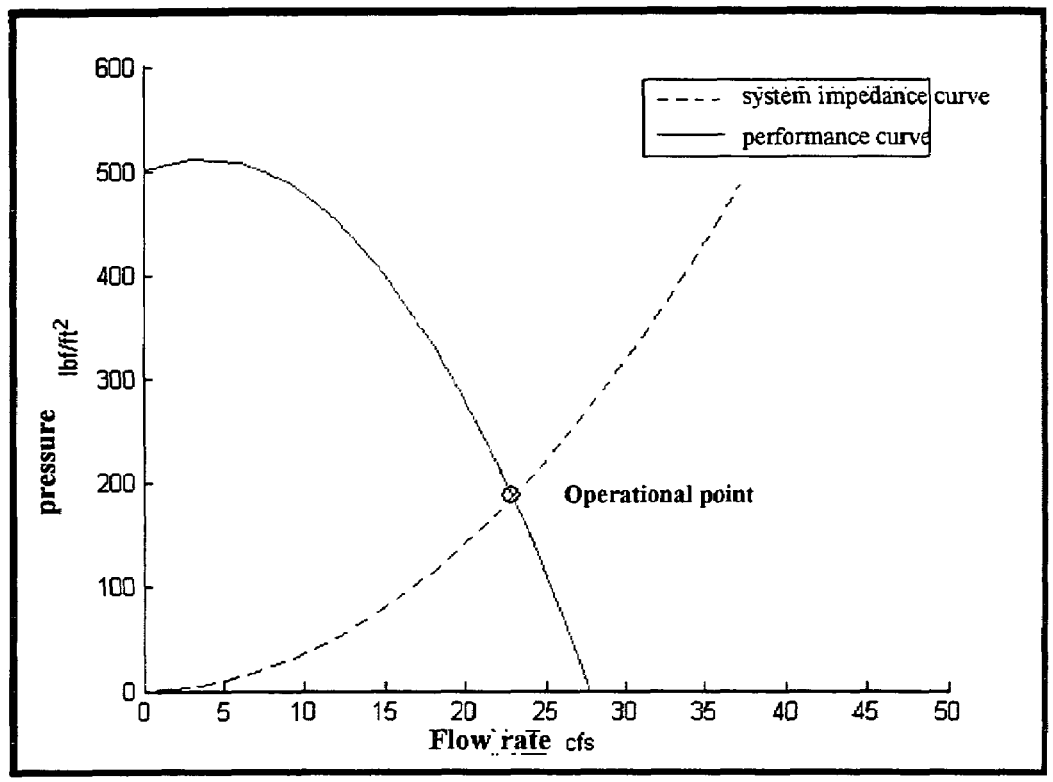
FIG. 4 is a diagram showing the performance curve of a fluid-transport machine and the system impedance curve.
Figure 5:
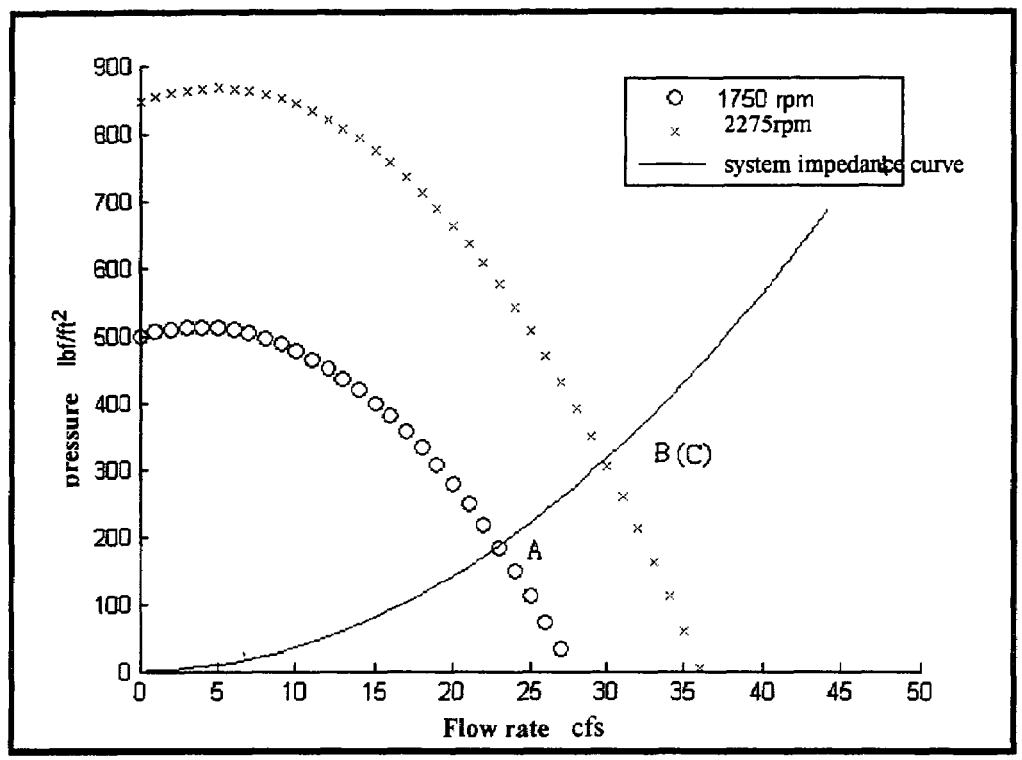
FIG. 5 is a diagram showing the performance curves of a fluid-transport machine operating at the rotation speeds of 1750 rpm and 2275 rpm.
Figure 6:
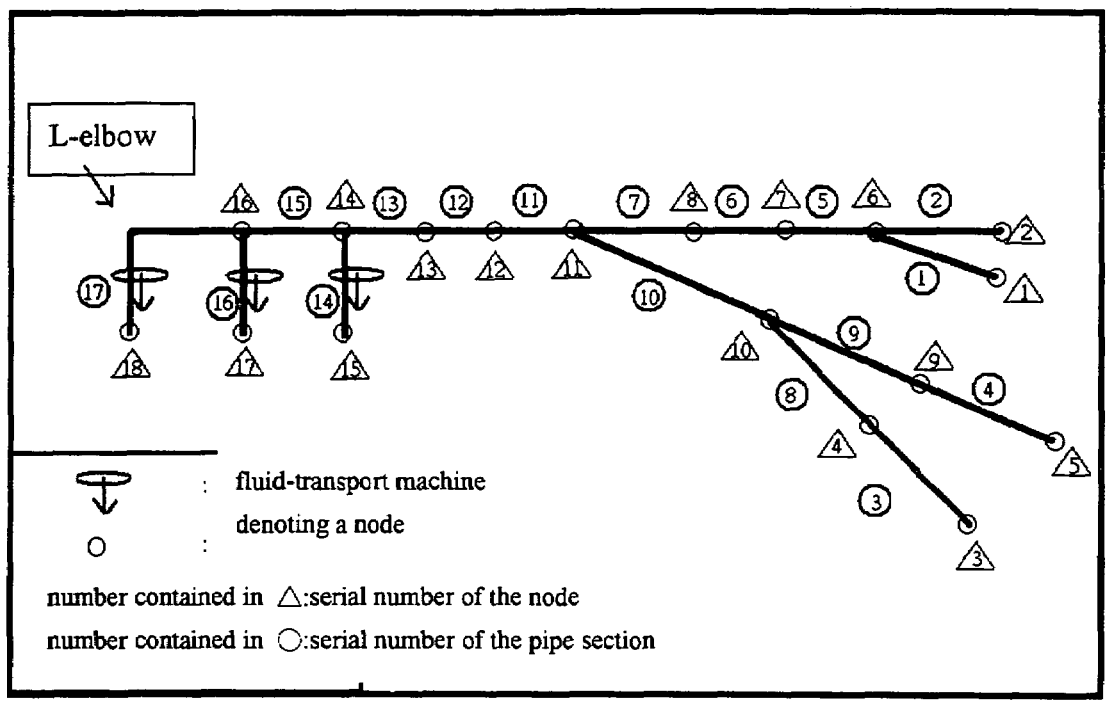
FIG. 6 is a diagram showing the structure of a load piping system.
Figure 8:
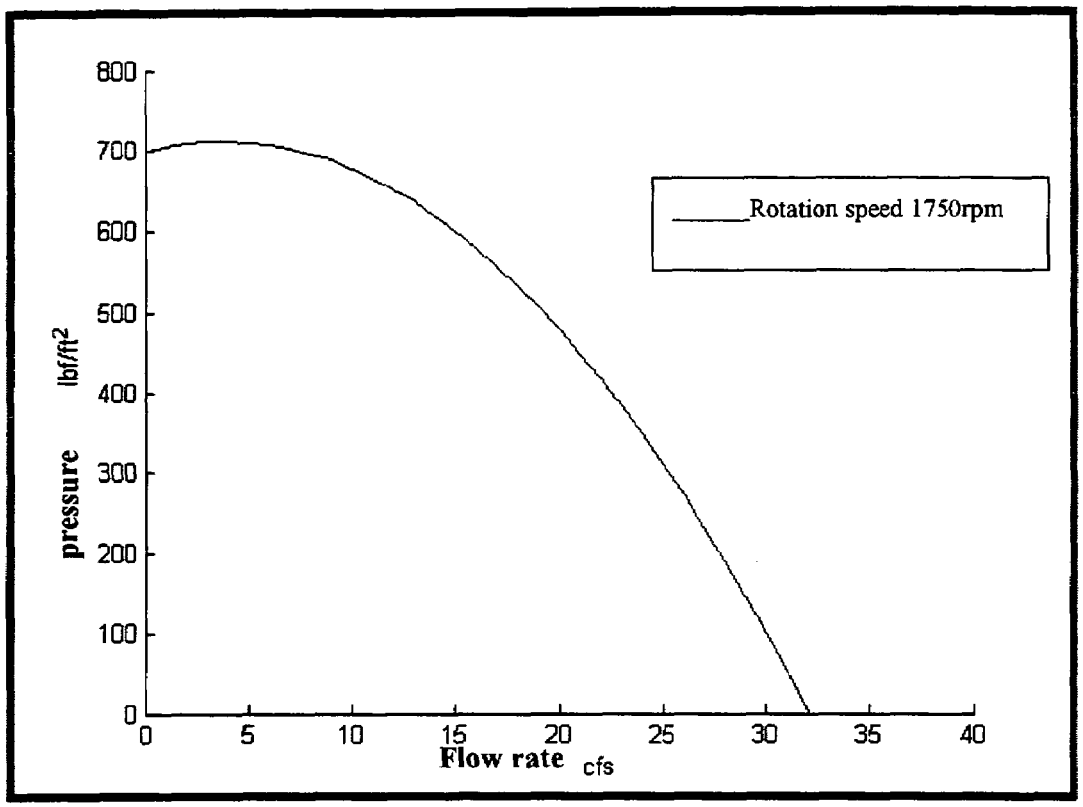
FIG. 8 is a diagram showing the performance curves of a fluid-transport machine operating at the rotation speed of 1750 rpm.
Figure 9:
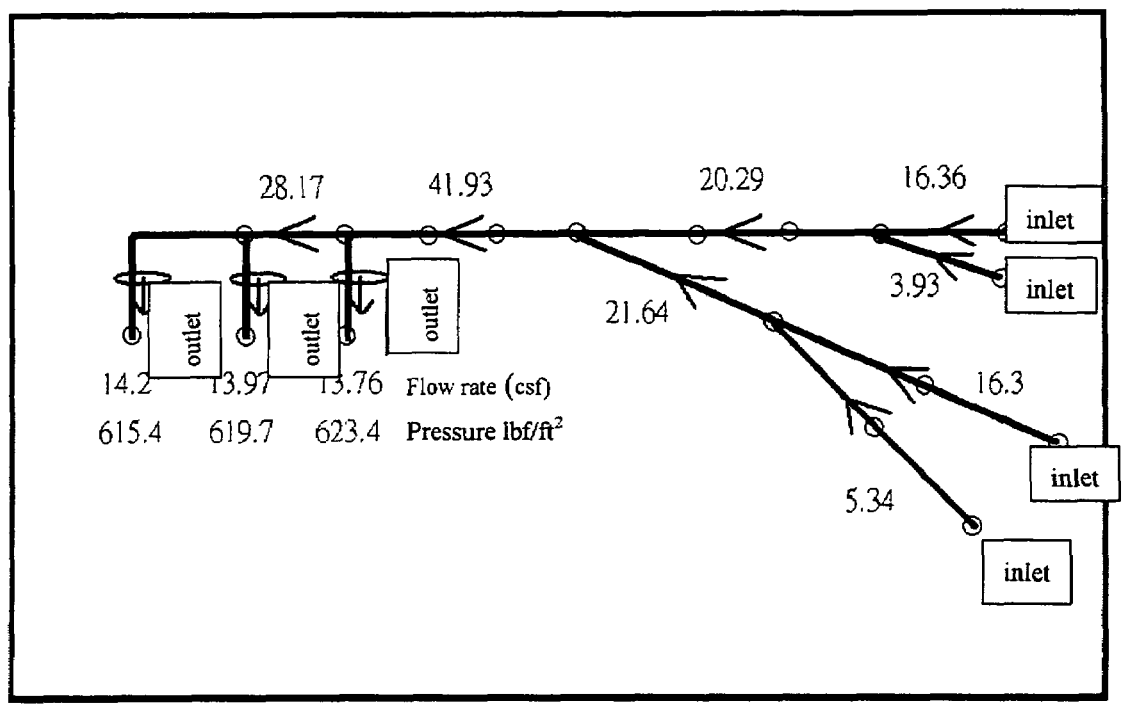
FIG. 9 is a diagram showing the flow rate distribution in each of the outlets when the fluid-transport machines operate at the rotation speed of 1750 rpm.
Figure 10:
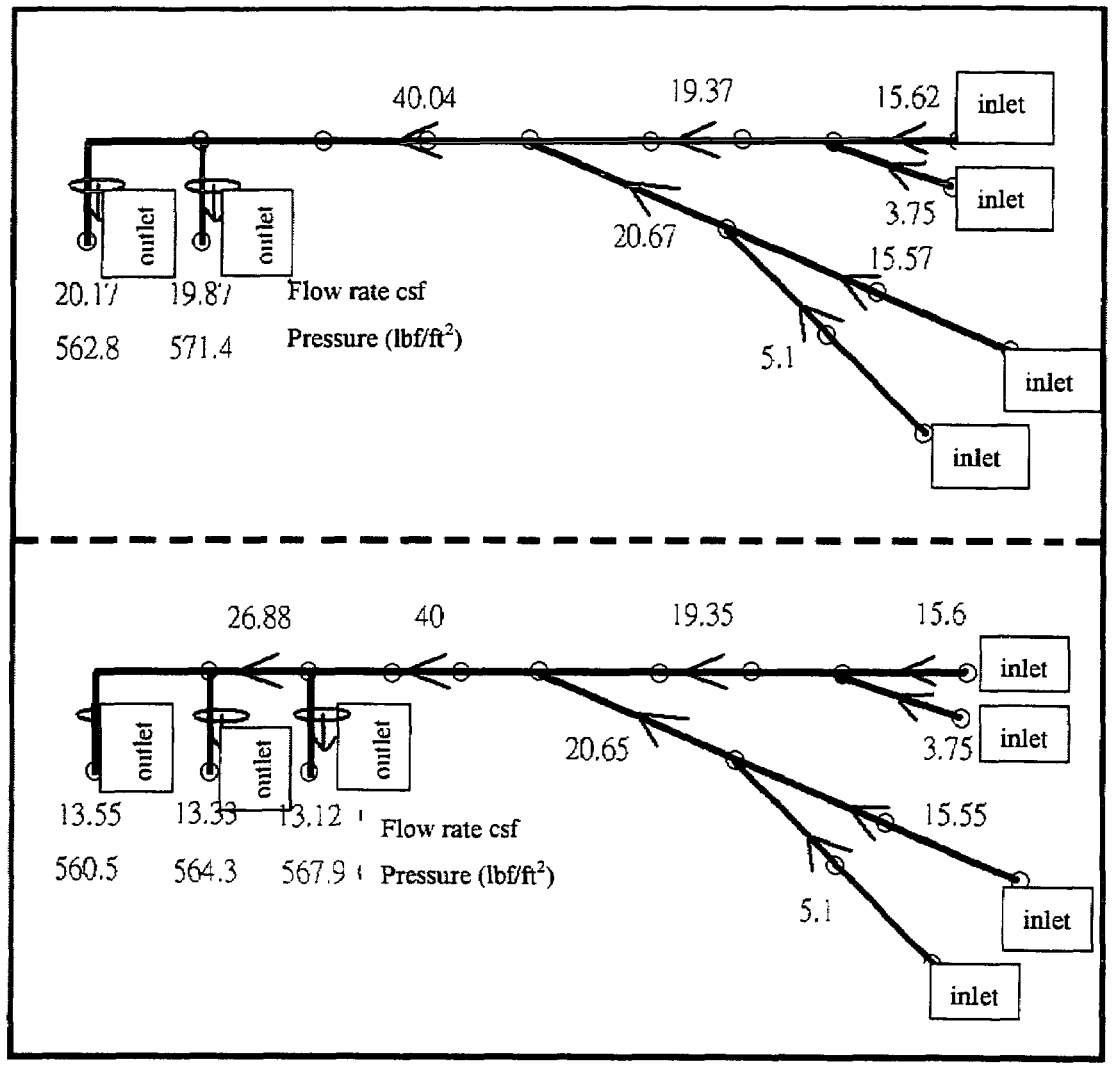
FIG. 10 is a diagram showing the flow rate distribution in each of the outlets when the fluid-transport machines operate at the rotation speed of 1670 rpm.
Figure 11:
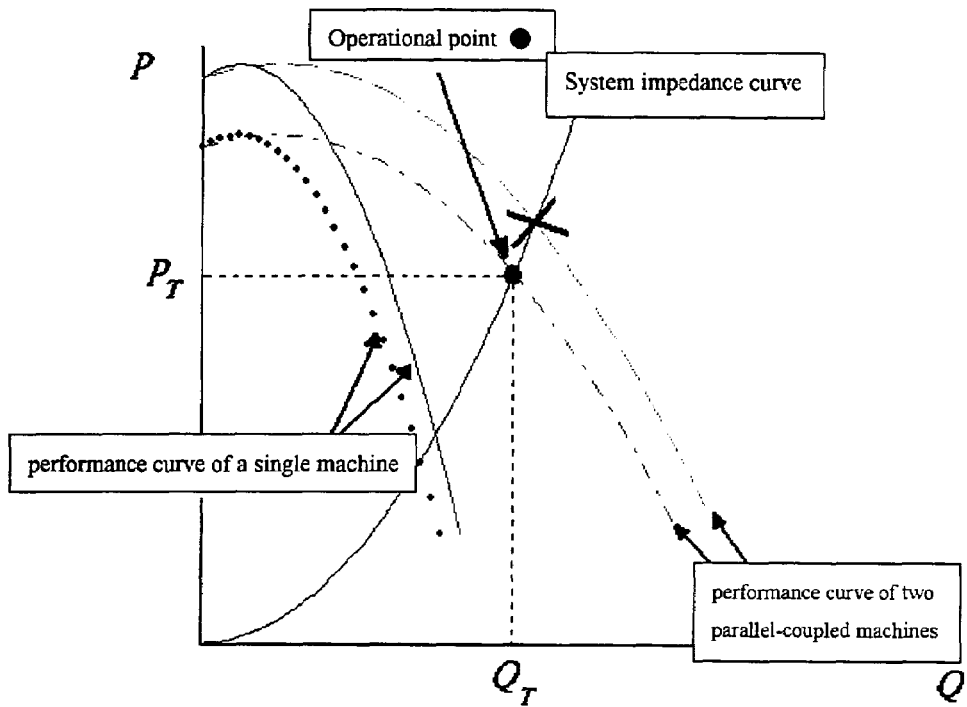
FIG. 11 is a diagram showing the flow rate and the pressure required by the system and the performance curves of the system of two fluid-transport machines coupled in parallel and the system of three fluid-transport machines coupled in parallel.
Figure 12:
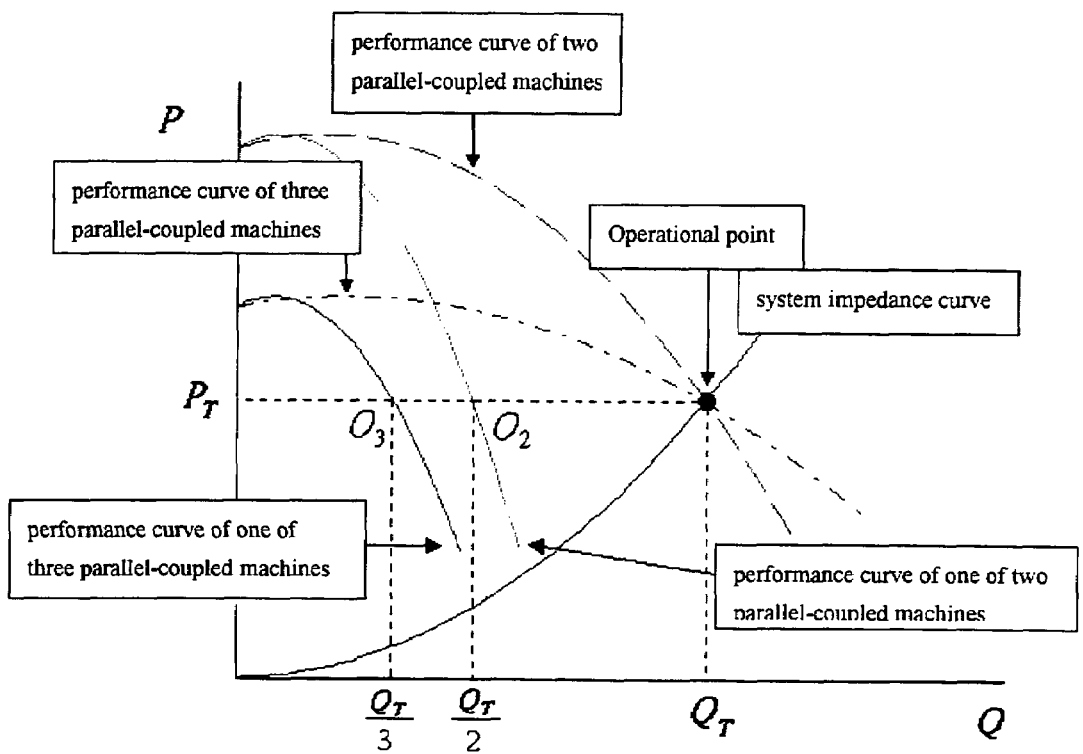
FIG. 12 is a diagram showing the performance curves of the system of two fluid-transport machines coupled in parallel and the system of three fluid-transport machines coupled in parallel.

In the conventional operational method, the system impedance can be calculated from the piping layout and the flow rate of each pipe section, and the system impedance curve can be formed via plotting the system impedance against the flow rate, and the conventional operational method comprises the following procedures:

(1) Turn on a first pump; however, as shown in FIG. 11, the performance curve of the single pump (the solid curve) cannot intercept the system impedance curve at Operational Point O of $P=P_T$ and $Q=Q_T$;

(2) Turn on a second pump with the operational conditions the same as that of the first pump; the performance curve of two [parallel-coupled] pumps coupled in parallel (---) intercepts the system impedance curve at Point X, which exceeds the system requirement; then, the rotation speeds of those two pumps are lowered, and thus, the performance curve of two pumps coupled in parallel (-·-) can intercept the system impedance curve at Operational Point O;

(3) If a third pump is also turned on, as shown in FIG. 12, via appropriately adjusting the rotation speed of each pump similar to that used in the case of two pumps coupled in parallel, the performance curve of three pumps coupled in parallel can also intercept the system impedance curve at Operational Point O;

(4) Keep on increasing the number of operating pumps, via appropriately adjusting the rotation speed of each pump similarly, the performance curve of multiple pumps coupled in parallel can also intercept the system impedance curve at Operational Point O;

(5) Thus, the system requirement can be satisfied with only two pumps coupled in parallel or more.

However, the conventional operational method leaves the following problems to be solved: how many pumps should be parallel coupled so that the system can be the most energy-efficient, and how to adjust the number of pumps coupled in parallel to achieve the optimal state when the system impedance curve is changed by the change of the required flow rate, which are also the subjects the present invention desires to overcome.

From the pump theory, it is known: when the output flow rate of each pump is the same, energy saving is more likely to achieve. For example, the case of $Q_1=Q_2=Q_3$ is more energy-efficient that the case of $Q_1 \neq Q_2 \neq Q_3$. Therefore, making the flow rate output by each pump be equal will be the first task intended to do.

To enable the flow rate of each pump to be equal, power meters are respectively installed to all the pumps, and according to the values detected by the power meters, the flow rate of each pump can be obtained by:

$$HP = \frac{P \times Q}{\text{constant}} \quad (42)$$

wherein P is the system pressure and maintained unchanged; the constant is the product of the pump efficiency and the unit conversion factor. The efficiency should be identical when the states of all the pumps are the same. Once the power is known, the flow rate will be known also. In other words, if the power of each pump is identical, i.e. $HP_1=HP_2=HP_3$, $Q_1=Q_2=Q_3$. Flow meters can also be installed to the pumps, and the flow rate can be directly detected; however, the error of the flow meter is great, and the response thereof is also slow; therefore, using power meters is a more suitable measure.

The abovementioned method can achieve a better energy-efficient effect when multiple pumps are coupled in parallel, but it cannot determine how many pumps should be parallel coupled to achieve the best energy-efficient effect yet; for example, it cannot determine which one of $Q_1=Q_2=Q_3$ and $Q_1=Q_2$ is better.

FIG. 12 shows the performance curve of two pumps coupled in parallel and the performance curve of one of those two pumps coupled in parallel, wherein via flow meters, those two pumps are adjusted so that $$Q_1 = Q_2 = \frac{Q_T}{2}$$

and $P_1 = P_2 = P_T$. The dashed curve is the performance curve of two pumps coupled in parallel, and appropriately adjusting the rotation speed of each pump can enable the performance curve of two pumps coupled in parallel to intercept the system impedance curve at Operational Point O. The solid curve is the performance curve of one of those two pumps coupled in parallel, and Point $O_2$ thereof has the flow rate of $$\frac{Q_T}{2}$$

and the pressure of $P_T$. FIG. 12 also shows the performance curve of three pumps coupled in parallel and the performance curve of one of those three pumps coupled in parallel, wherein via flow meters, those three pumps are adjusted so that $$Q_1 = Q_2 = Q_3 = \frac{1}{3}Q_T$$

and $P_1 = P_2 = P_3 = P_T$. The dot-dashed curve is the performance curve of three pumps coupled in parallel, and similarly, appropriately adjusting the rotation speed of each pump can enable the performance curve of three pumps coupled in parallel to intercept the system impedance curve at Operational Point O. The performance curve of one of those three pumps coupled in parallel is denoted by the other solid curve, and Point $O_3$ thereof has the flow rate of $$\frac{1}{3}Q_T$$

and the pressure of $P_T$. Both the measure of two pumps coupled in parallel and the measure of three pumps coupled in parallel can achieve the pressure $P_T$ and the flow rate $Q_T$ required by the system. The pressures provided by the pumps of both the measures are all equal to $P_T$; however, the flow rates provided by the pumps of both the measures are respectively $$\frac{Q_T}{2} \text{ and } \frac{Q_T}{3},$$

and Point $O_2$ is different from Point $O_3$.

Figure 13:
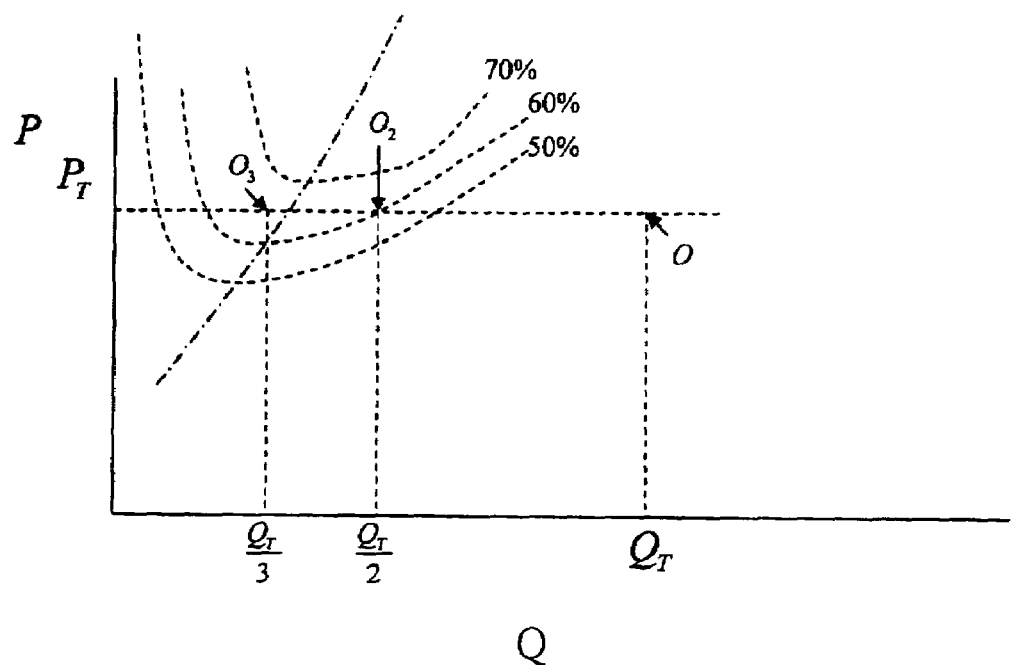
FIG. 13 is a diagram showing the data relating to pressure and flow rate and containing equal-efficiency curves

As mentioned above, the manufacturer provides the equal-efficiency curves for each specification of pump. Plotting the equal-efficiency curves on FIG. 12 will obtain FIG. 13. The hyperbolic dashed curves on FIG. 13 are respectively the equal-efficiency curves of 70% efficiency ($\eta$), 60% efficiency ($\eta$) and 50% efficiency ($\eta$), which are plotted directly from the data provided by the manufacturer, and the bottom points thereof are interconnected to form a dot-dashed curve. As there is the constraint of constant pressure $P_T$, Point $O_2$, Point $O_3$, and Point O are all on the same horizontal line. In FIG. 13, Point $O_2$ is on the equal-efficiency curve of 60% efficiency ($\eta$), and Point $O_3$ is on the equal-efficiency curve of about 65% efficiency ($\eta$). The total output power of the pumps coupled in parallel $(HP)_T$ is the product of $(HP)_{SINGLE\ PUMP}$ and the number n of pumps coupled in parallel:

$$(HP)_T = HP_{SINGLE\ PUMP} \times \text{the number of pumps}(n) \quad (43)$$

wherein $$(HP)_{SINGLE\ PUMP} = \frac{P_T \times Q}{\text{constant} \times \eta(\%)} \quad (44)$$

Thus, $$(HP)_{T2} = \frac{P_T \times \frac{1}{2}Q_T}{\text{constant} \times (60\%)} \times 2 = \frac{P_T \times Q_T}{\text{constant} \times (60\%)} \quad (45)$$

$$(HP)_{T3} = \frac{P_T \times \frac{1}{3}Q_T}{\text{constant} \times (65\%)} \times 3 = \frac{P_T \times Q_T}{\text{constant} \times (65\%)} \quad (46)$$

From equations (45) and (46), it is known: $(HP)_{T3}$ is smaller than $(HP)_{T2}$, i.e. the total output power of three pumps coupled in parallel is smaller than that of two pumps coupled in parallel; in other words, the system of three pumps coupled in parallel is more energy-efficient than the system of two pumps coupled in parallel.

When the system flow rate is changed to meet the requirement of fabrication, the system impedance curve will also change. When the flow rate increases, the system impedance curve will shift right, and when the flow rate decreases, the system impedance curve will shift left. When the flow rate increases, there are two measures to deal with it: (1) do not increase the number of pumps but raise the rotation speed of the existing pumps, (2) do not raise the rotation speed of the pumps but increase the number of pumps (In this case, the rotation speed may even need to decrease). According to the abovementioned principles, the total powers of those two measures can be respectively worked out to determine which measure has smaller power consumption and then determine which measure is to be adopted. When the flow rate decreases, there are also two measures to deal with it: (1) do not decrease the number of pumps but lower the rotation speed of the existing pumps, (2) do not lower the rotation speed of the pumps but decrease the number of pumps (In this case, the rotation speed may even need to increase). Similarly, the total powers of those two measures can be respectively worked out to determine which measure has smaller power consumption, and which measure is to be chosen depends on which measure consumes less power.

Figure 14:
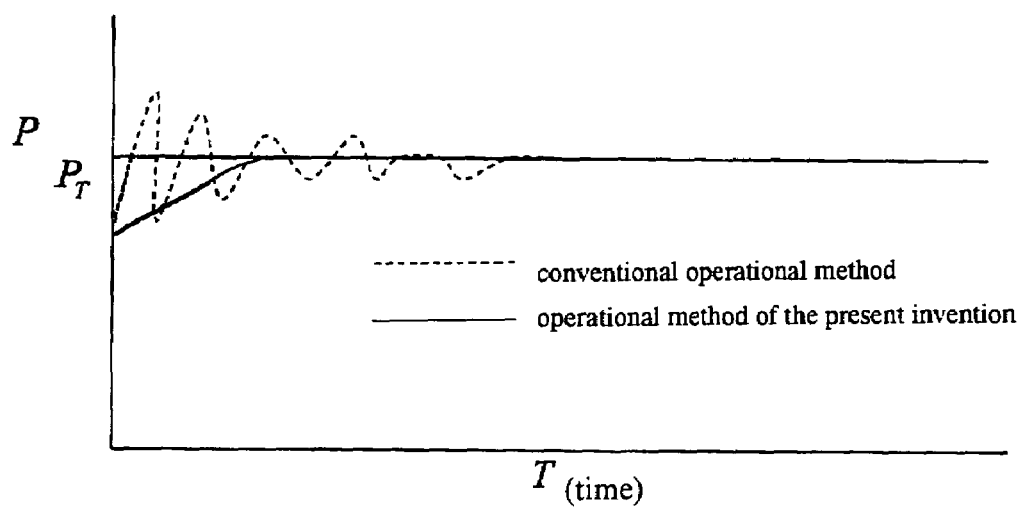
FIG. 14 is a diagram showing the convention operational method and the operational method of the present invention.

When the system impedance curve is changed, decreasing, increasing, or maintaining the number of pumps needs an operation action to change the rotation speeds of the pumps, which is very critical to the high-tech factory. It is well known: high-tech factories take maintaining the stability of operational environment very seriously; inappropriate change of operational environment will endanger the fabricating products. It is often reported by the news: a short instability of power supply instantly harms local manufacturers and causes considerable loss. According to the principle of the performance curve, when the rotation speed of pumps is changed, the pressure of fluid supply would be changed also. Similar to the change of power supply voltage, the change of pressure also has a profound influence. Just a slight imprudence may cause a serious damage. For the current system, the time allowed to adjust the system is very short; further, after the pressure is changed, the system requires response time to resume the stability of pressure. In the conventional operational method, when the system needs to increase flow rate, the rotation speed is often firstly raised so steeply that the pressure is found exceeding the set pressure very soon; then, the rotation speed is reduced so steeply that the pressure is found lower than the set pressure very soon again; then, the rotation speed is raised once more. After a period of repeating the abovementioned process, the system finally assumes a stable pressure performance at the set pressure. The relationship of pressure (P) versus time (T) of the abovementioned process is shown by the dashed curve of FIG. 14.

Pressure is the driving force of fluid. The inappropriate change of pressure will cause the sudden change of the flow rate supply at the outlets, which will certainly bring about damage on the products and always besets the manufacturers, the operators and the maintenance personnel. In the conventional technologies, when the requirement of flow rate is decreased, how to lower the rotation speed of pumps or how many pumps is to be turned off is an unknown; therefore, the measure to deal with the change is often not to change, i.e. the operational conditions is maintained unchanged, but the surplus fluid is recycled. It is obviously spending precious energy in vain.

Accordingly, the present invention proposes a scheme to rapidly and energy-efficiently deal with the abovementioned flow rate change. From those discussed above, it is known: when the system impedance curve is changed (i.e., the required flow rate is changed), the system and method proposed by the present invention can quickly work out the optimal number of operating pumps and the optimal rotation speed thereof. Thus, the rotation speed of pumps will be adjusted to be slightly less than the optimal rotation speed. When the pressure change is confirmed, the pumps will be slightly adjusted once more to operate at the optimal rotation speed. The relationship of pressure (P) versus time (T) of the abovementioned process is shown by the solid curve of FIG. 14. Thereby, the fluid pressure of the system will not rise and fall repeatedly, and the flow supply at the outlets will no more increase and decrease alternately. Therefore, the present invention advantages the quality stability very much.

Figure 15:
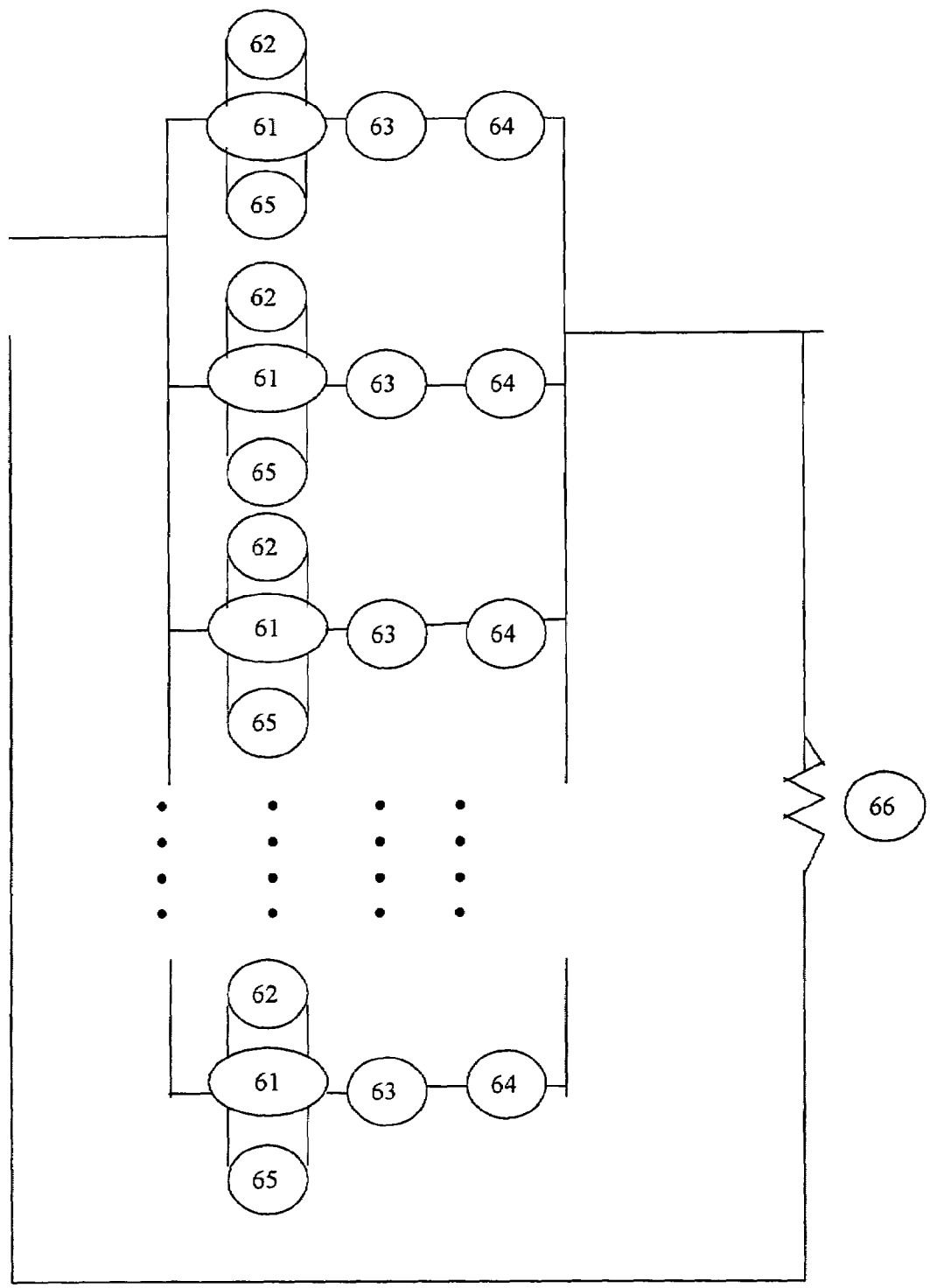
FIG. 15 is a diagram showing the layout of the constituent parts of the present invention.
Figure 16:
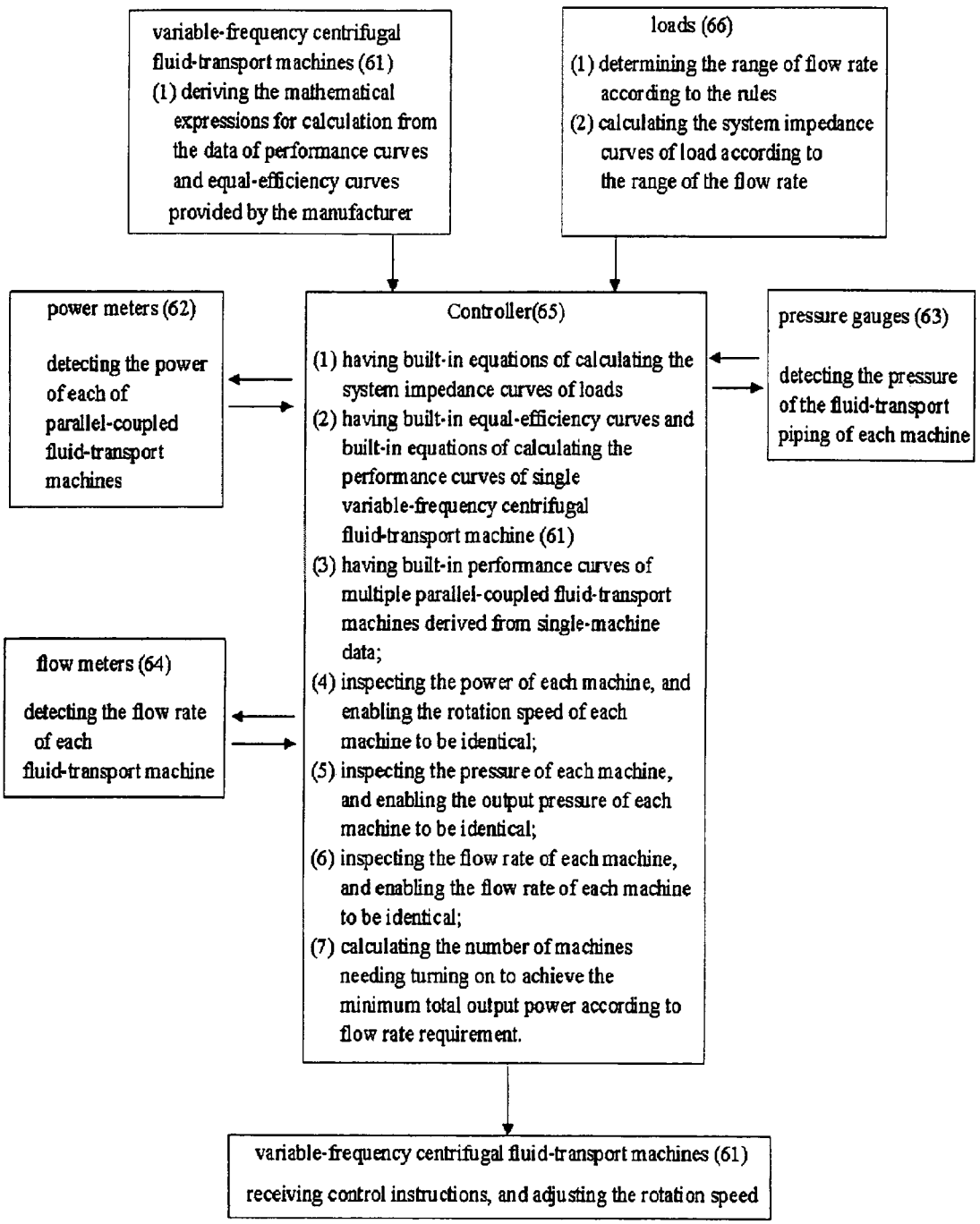
FIG. 16 is a diagram showing the architecture of the system control.

According to the embodiments of the present invention, the system of energy-efficient and constant-pressure fluid-transport machines coupled in parallel of the present invention comprises: multiple variable-frequency centrifugal fluid-transport machines (61), multiple power meters (62), multiple pressure gauges (63), multiple flow meters (64), multiple controllers (65) and a load piping system (66), as shown in FIG. 15. The functions of those constituent parts, the interactions thereof and the control procedures are shown in FIG. 16 a diagram showing the control architecture of the system of the present invention.

In conclusion, the present invention proposes a system of energy-efficient and constant-pressure fluid-transport machines coupled in parallel, wherein the data required by the fluid-transport machines coupled in parallel is worked out via theoretical analysis and equation deduction; the worked-out data is used to control the system of fluid-transport machines coupled in parallel so that the system operation can be secure and quick. Further, the present invention can work out the output powers of the system of different numbers of fluid-transport machines coupled in parallel and then can determine the number of operating fluid-transport machines, which can achieve the best energy-efficient performance according to the output powers thereof. The present invention is distinct from the abovementioned published patents; therefore, the novelty and non-obviousness of the present invention is doubtless.

What is claimed is:

1. An operation method of energy-efficient and constant-pressure fluid-transport machines coupled in parallel, comprising:

providing a system impedance curve of a load, wherein said system impedance curve is determined by a flow rate and impedance of said load;

providing a performance curve and an equal-efficiency curve of a fluid-transport machine, wherein said performance curve of said fluid-transport machine is determined by a flow rate and pressure of said fluid-transport machine;

coupling a plurality of said fluid-transport machines in parallel to calculate a performance curve of said fluid-transport machines in parallel, wherein said performance curve of said fluid-transport machines in parallel intercepts said system impedance curve with an operational point, and said operational point is corresponding to said pressure and said flow rate of said load;

comparing a plurality of total output powers to acquire a number of fluid-transport machines in parallel according to said pressure of said load, said flow rate of said load and said performance curves of said fluid-transport machines, wherein said total output power corresponding to said number of fluid-transport machines in parallel is minimum in said total output powers;

determining a flow rate of fluid-transport machines in parallel by dividing said flow rate of said load with said number of fluid-transport machines in parallel; and adjusting a rotation speed of each of said fluid-transport machines in parallel to make said flow rate of fluid-transport machines in parallel fixed.

2. The operation method of claim 1, further comprising turning on or shutting down said fluid-transport machines in parallel.

3. An operation method of energy-efficient and constant-pressure fluid-transport machines coupled in parallel, comprising:

providing a system impedance curve of a load, wherein said system impedance curve is determined by a flow rate and impedance of said load;

providing a performance curve and an equal-efficiency curve of a fluid-transport machine, wherein said performance curve of said fluid-transport machine is determined by flow rate and pressure of said fluid-transport machine;

coupling a plurality of said fluid-transport machines in parallel to calculate a performance curve of said fluid-transport machines in parallel, wherein said performance curve of said fluid-transport machines in parallel intercepts said system impedance curve with an operational point, and said operational point is corresponding to said pressure and said flow rate of said load;

comparing a plurality of total output powers to acquire a number of fluid-transport machines in parallel according to said pressure of said load, said flow rate of said load and said performance curves of said fluid-transport machines, wherein said total output power corresponding to said number of fluid-transport machines in parallel is minimum in said total output powers;

determining a flow rate of fluid-transport machines in parallel by dividing said flow rate of said load with said number of fluid-transport machines in parallel; and turning on or shutting down said fluid-transport machines in parallel according to said number of fluid-transport machines in parallel.

4. The operation method of claim 3, further comprising adjusting a rotation speed of each of said fluid-transport machines in parallel to make said flow rate of fluid-transport machines in parallel fixed.

* * * * *